US008626946B2

(12) United States Patent
Kamath et al.

(10) Patent No.: US 8,626,946 B2
(45) Date of Patent: Jan. 7, 2014

(54) SYSTEMS AND METHODS FOR HIERARCHICAL GLOBAL LOAD BALANCING

(75) Inventors: Sandeep Kamath, Bangalore (IN); Josephine Suganthi, Sunnyvale, CA (US); Anil Shetty, Union City, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 929 days.

(21) Appl. No.: 11/462,345

(22) Filed: Aug. 3, 2006

(65) Prior Publication Data

US 2008/0034111 A1 Feb. 7, 2008

(51) Int. Cl.
*G06F 15/173* (2006.01)
(52) U.S. Cl.
USPC .......................................... 709/238
(58) Field of Classification Search
USPC .......................................... 709/238
See application file for complete search history.

(56) References Cited

U.S. PATENT DOCUMENTS

| | | | |
|---|---|---|---|
| 6,061,341 A * | 5/2000 | Andersson et al. | 370/338 |
| 6,606,744 B1 | 8/2003 | Mikurak | |
| 6,671,818 B1 | 12/2003 | Mikurak | |
| 7,124,101 B1 | 10/2006 | Mikurak | |
| 7,130,807 B1 | 10/2006 | Mikurak | |
| 2004/0243709 A1* | 12/2004 | Kalyanavarathan et al. | 709/226 |
| 2005/0125553 A1* | 6/2005 | Wu et al. | 709/226 |
| 2005/0198200 A1* | 9/2005 | Subramanian et al. | 709/218 |
| 2005/0237952 A1* | 10/2005 | Punj et al. | 370/260 |
| 2005/0267952 A1 | 12/2005 | Ricciardi et al. | |
| 2006/0072482 A1* | 4/2006 | Voiss et al. | 370/254 |
| 2006/0123467 A1 | 6/2006 | Kumar et al. | |

(Continued)

FOREIGN PATENT DOCUMENTS

| | | |
|---|---|---|
| CN | 1503523 A | 6/2004 |
| WO | WO-2006074072 | 7/2006 |
| WO | WO-2008/112691 A2 | 9/2008 |
| WO | WO-2008112698 A2 | 9/2008 |

OTHER PUBLICATIONS

International Search Report, PCT/US2007/075037, mailed on Jan. 10, 2008.

(Continued)

*Primary Examiner* — William Goodchild
(74) *Attorney, Agent, or Firm* — Foley & Lardner LLP; Christopher J. McKenna

(57) ABSTRACT

Systems and methods are disclosed for providing a hierarchy of appliances to access resources across branch offices. A method comprises: establishing, by a first aggregator appliance, connections with a first plurality of branch office appliances; establishing, by a second aggregator appliance, connections with a second plurality of branch office appliances, the first plurality not having information identifying the second plurality; receiving, by the first aggregator appliance, from a first branch office appliance a request from a client for access to a resource; identifying, by the first aggregator appliance via the second aggregator appliance, a second branch office appliance from the second plurality to service the request; transmitting, by the first aggregator appliance, to the first branch office appliance information identifying the second branch office appliance; and establishing, by the first branch office appliance, a connection with the second branch office appliance. Corresponding systems are also described.

26 Claims, 10 Drawing Sheets

(56) References Cited

U.S. PATENT DOCUMENTS

| | | |
|---|---|---|
| 2007/0245409 A1 | 10/2007 | Harris et al. |
| 2008/0034416 A1 | 2/2008 | Kumar et al. |
| 2008/0046616 A1 | 2/2008 | Verzunov et al. |
| 2008/0049786 A1 | 2/2008 | Ram et al. |
| 2008/0225720 A1 | 9/2008 | Khemani et al. |
| 2008/0225748 A1 | 9/2008 | Khemani et al. |
| 2008/0225753 A1 | 9/2008 | Khemani et al. |
| 2008/0229381 A1 | 9/2008 | Sikka et al. |
| 2008/0320151 A1 | 12/2008 | McCanne et al. |

OTHER PUBLICATIONS

Written Opinion of the International Searching Authority, PCT/US2007/075037, mailed on Jan. 10, 2008.

First Office Action issued Nov. 23, 2011 in Chinese Patent Application No. 200780037294.3.

Second Office Action issued Aug. 22, 2012 in Chinese Patent Application No. 200780037294.3.

Third Office Action issued Jan. 15, 2013 in Chinese Patent Application No. 200780037294.3.

* cited by examiner

SYSTEMS AND METHODS FOR HIERARCHICAL GLOBAL LOAD BALANCING

FIELD OF THE INVENTION

The present invention generally relates to data communication networks. In particular, the present invention relates to systems and methods for providing aggregator appliances for global and hierarchical load balancing of branch offices.

BACKGROUND OF THE INVENTION

A corporate or enterprise network may service many branch offices. Each branch office may have its own network, servers and resources. An appliance may be deployed at a branch office to provide gateway services locally to the client or servers located at the branch office. In the corporate-wide network, branch office appliances may be deployed at each of the branch offices. Many resources, such as servers, applications, data files may be deployed across these branch offices. Additionally, a branch office may have under utilized resources and available computing time.

At any of the branch offices there may be resources that could be available or useful to access by users or computing devices at other branch offices. For example, a client of a first branch office may want to access a resource, such as an application, on a server at a second branch office. In some cases, the client of the first branch office is not aware of the existence or availability of resources at the second branch office. In other cases, resources at branch offices lay idle as they are not easily available to users across the corporate network. This results in inefficient use of the corporate network and deployed resource. In order to avail a client of a branch office access to resources from another branch office, an administrator may need to manually and specifically configure the gateway or branch office appliance to know of the other appliances in the network. With resources deployed across many branch offices, each of the branch office appliances may need to be manually configured to know of the other branch office appliances. This leads to significant amount of time and costs in configuring and maintaining multiple branch office appliances or gateway.

It would, therefore, be desirable to provide systems and methods to reduce branch office configuration while load-balancing resources globally across the enterprise and branch offices.

BRIEF SUMMARY OF THE INVENTION

The present invention is directed towards an aggregator appliance that provides aggregation and load-balancing of branch office appliances in a hierarchical fashion and a manner that reduces configuration of the branch office appliance. Any of the branch office appliances may be configured to know of or identify a single aggregator appliance 400. For example, a first branch office appliance may be configured to identify and connect to the first aggregator appliance. The first branch office appliance may not be configured to have any information and therefore may not know of the second aggregator appliance or any branch office appliances connected to the second aggregator appliance. In this manner, the configuration of branch office appliance is reduced. Even though the configuration is reduced, a branch office appliance servicing a request may access any of the other appliances known to an aggregator appliance. Since the aggregator appliances share information on branch office appliance, a first aggregator appliance can identify to a first branch office appliance information identifying any of the branch office appliances connected via any of the aggregator appliances. In this way, resource requests can be load balanced globally across all branch offices and branch office appliances.

In one aspect, the present invention is related to a method for providing a hierarchy of appliances to more efficiently access resources across a plurality of branch offices. The method includes the steps of: establishing, by a first aggregator appliance, connections with a first plurality of branch office appliances, and establishing, by a second aggregator appliance, connections with a second plurality of branch office appliances. The first plurality of branch office appliances may not have information identifying the second plurality of branch office appliances. The second plurality of branch office appliances may also not have information identifying the first plurality of branch office appliances. The method includes receiving, by the first aggregator appliance, from a first branch office appliance of the first plurality of branch office a request from a client for access to a resource. The first aggregator appliance identifies via the second aggregator appliance a second branch office appliance from the second plurality of branch office appliances to service the request. The first aggregator appliance transmits to one of the client or a first branch office appliance information identifying the second branch office appliance. The method includes the client establishing a connection with the second branch office appliance.

In one embodiment, the method includes transmitting, by the first branch office appliance, information identifying the second branch office appliance to the client. In another embodiment, the method includes establishes, by the client via the first branch office appliance, a second connection via the second branch office appliance with a server. In some embodiments, the method includes establishing, by the first aggregator appliance, communications with the second aggregator appliance. In one embodiment, the first aggregator appliance communicates information about the first plurality of branch office appliances to the second aggregator appliance. In another embodiments, the second aggregator appliance communicates information about the second plurality of branch office appliances to the first aggregator appliance.

In another embodiment, the method includes determining, by the first aggregator appliance, information on performance or operational characteristics for each of the first plurality of branch office appliances. In some embodiments, the method includes determining, by the second aggregator appliance, performance or operational characteristics of each of the second plurality of branch office appliances. In one embodiment, the method includes selecting, by the first or second aggregator appliance, the second branch office appliance based on one of the performance or operational characteristics.

In yet another embodiment, the method includes by the first office branch office appliance or the second branch office appliance, communications between the client and the server. The method may include accelerating using one or more of the following techniques: 1) compression, 2) TCP connection pooling, 3) TCP connection multiplexing, 4) TCP buffering, and 5) caching. In some embodiments, the first aggregator appliance or the second aggregator appliance is deployed at a data center. In another embodiment, the client is deployed at the first branch office.

In another aspect, the present invention is related to a system for providing a hierarchy of appliances to more efficiently access resources across a plurality of branch offices, the system comprises a first aggregator appliance and a second aggregator appliance. The first aggregator appliance establishes connections with a first plurality of branch office appliances. The second aggregator appliance establishes connections with a second plurality of branch office appliances. The first plurality of branch office appliances may not have information identifying the second plurality of branch office appliances. The second plurality of branch office appliances may also not have information identifying the first plurality of branch office appliances. The system also includes a first branch office appliance of the first plurality of branch offices transmitting to the first aggregator appliance a request from a client for access to a resource. The first aggregator appliance identifies via the second aggregator appliance a second branch office appliance from the second plurality of branch office appliances to service the request and transmits to the first branch office appliance information identifying the second branch office appliance. The system also includes the client establishing a connection with the second branch office appliance.

In one embodiment, the first branch office appliance transmits information identifying the second branch office appliance to the client. In another embodiment, the client establishes via the first branch office appliance a second connection via the second branch office appliance with a server. In some embodiments, the first aggregator appliance establishes communications with the second aggregator appliance. In one embodiment, the first aggregator appliance communicates information about the first plurality of branch office appliances to the second aggregator appliance. In yet another embodiment, the second aggregator appliance communicates information about the second plurality of branch office appliances to the first aggregator appliance. In some embodiments, the first or second aggregator appliance determines information on performance or operational charactersitics for each of the first plurality of branch office appliances. In another embodiment of the system, the first aggregator appliance selects the second branch office appliance based on one of the performance or operational characteristics.

In some embodiments, the first office branch office appliance or the second branch office appliance accelerates communications between the client and a server. The acceleration techniques may include one or more of the following: 1) compression, 2) TCP connection pooling, 3) TCP connection multiplexing, 4) TCP buffering, and 5) caching. In other embodiments, the first aggregator appliance or the second aggregator appliance is deployed at a data center. In one embodiment, the client is deployed at the first branch office.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which.

Figure 1A:
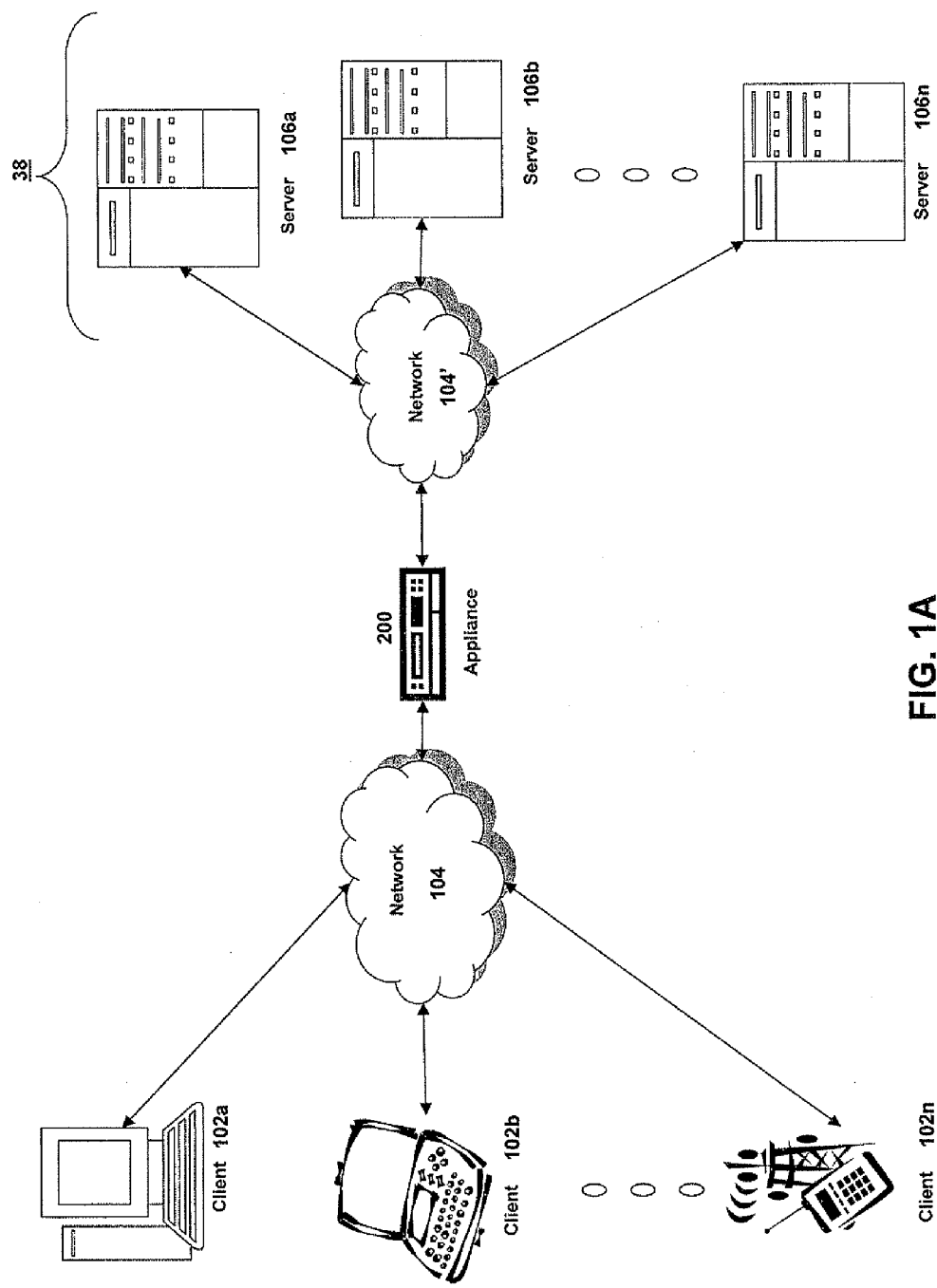
FIG. 1A is a block diagram of an embodiment of a network environment for a client to access a server via an appliance.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

A. Network and Computing Environment

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104,104' as the client 102. One or more appliances 200 may be located at any point in the network or network communications path between a client 102 and a server 106.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
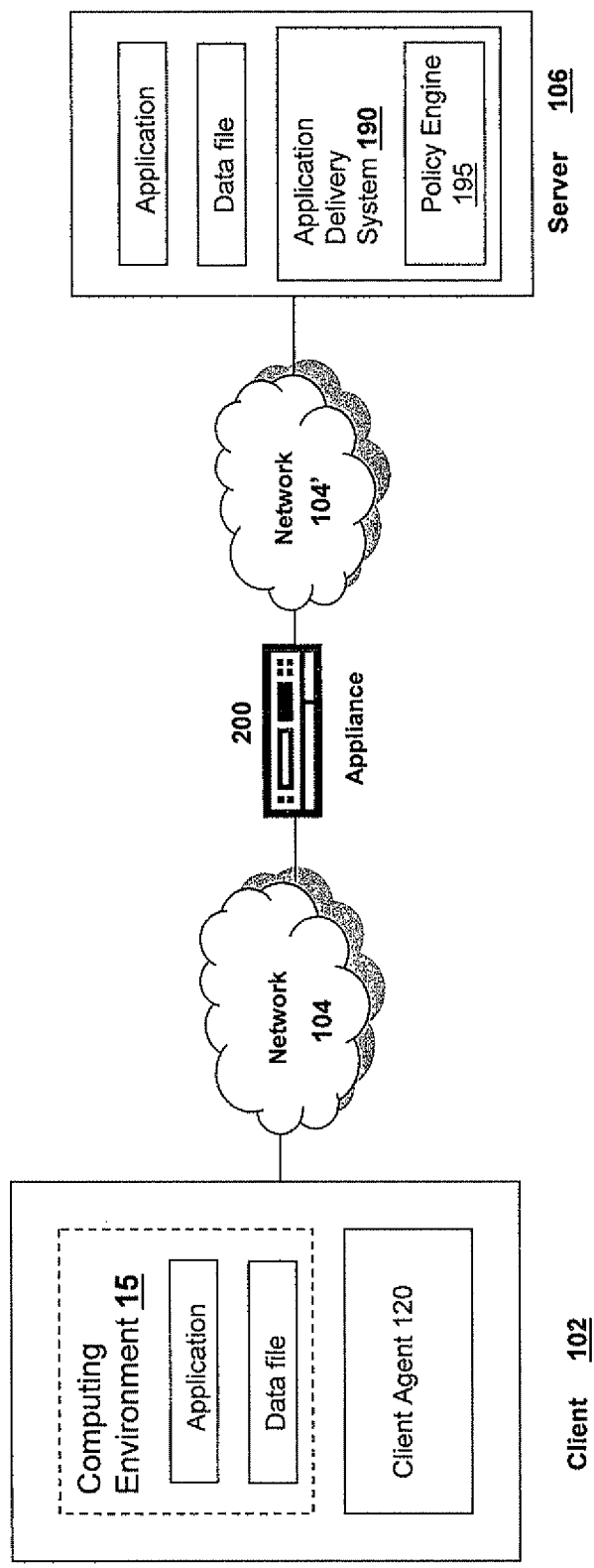
FIG. 1B is a block diagram of an embodiment of an environment for delivering a computing environment from a server to a client via an appliance.

Referring now to FIG. 1B, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. It yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEX™ provided by WebEx, Inc. of Santa Clara, Calif., or Microsoft Office Live Meeting provided by Microsoft Corporation of Redmond, Wash.

Figure 1C:
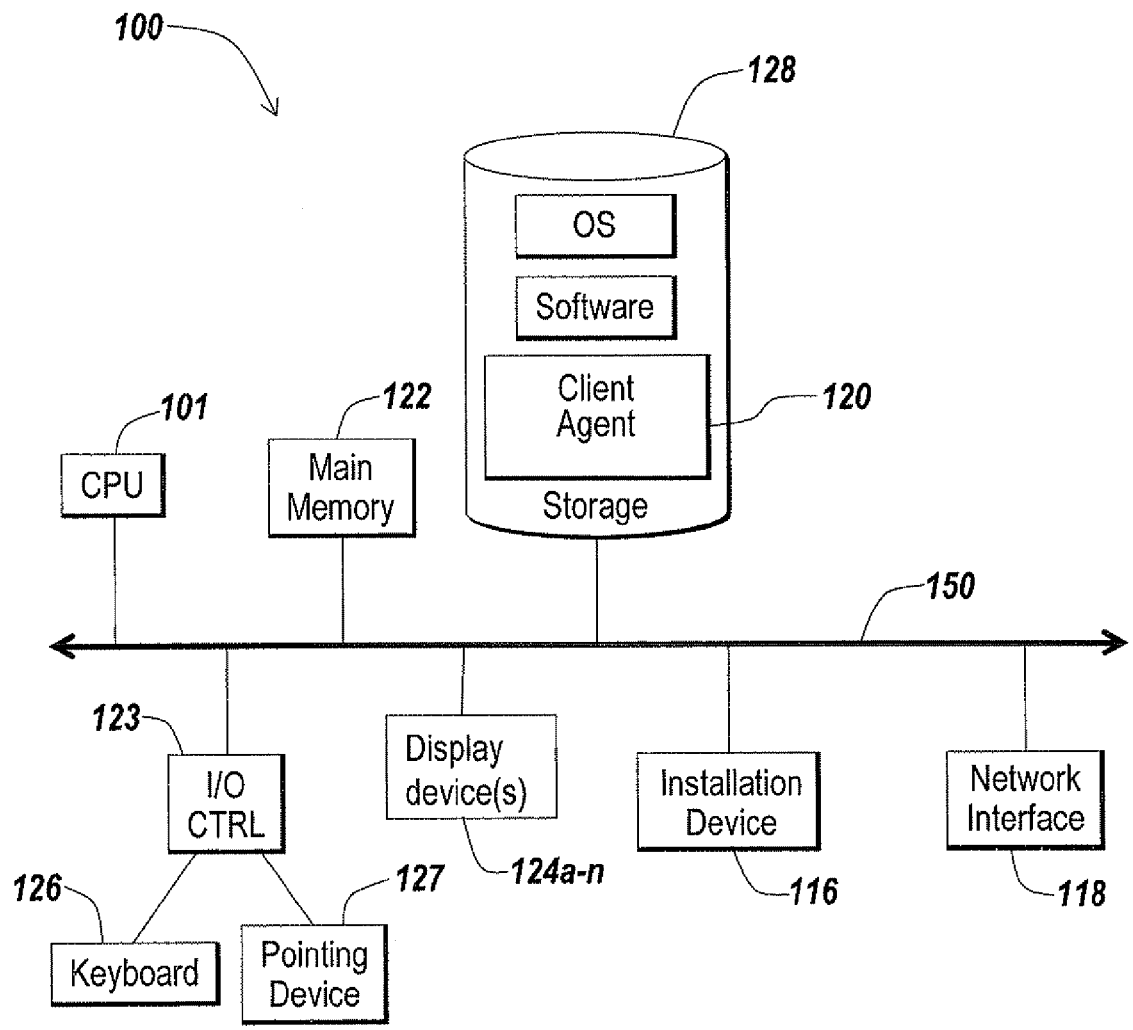
FIGS. 1C and 1D are block diagrams of embodiments of a computing device.
Figure 1D:
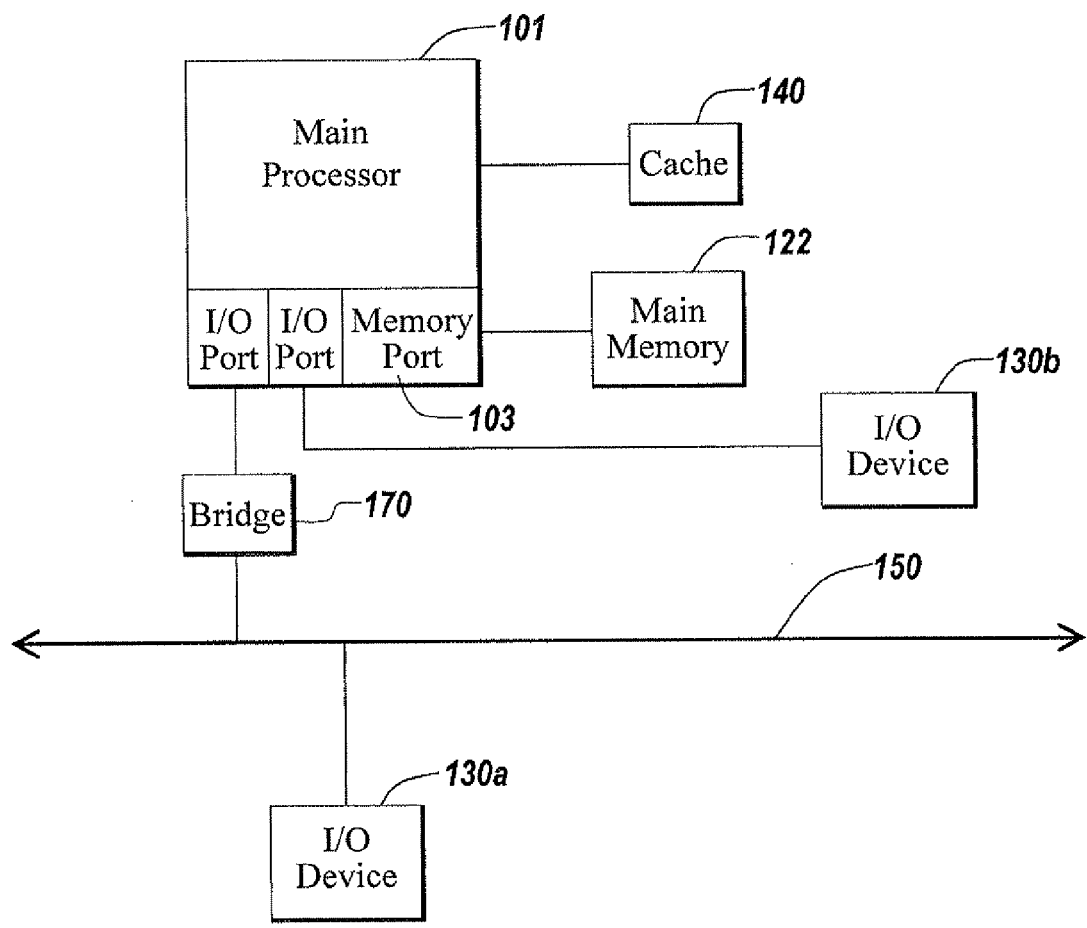

The client 102, server 106, and appliance 200 may be deployed as and/or executed on any type and form of computing device, such as a computer, network device or appliance capable of communicating on any type and form of network and performing the operations described herein. FIGS. 1C and 1D depict block diagrams of a computing device 100 useful for practicing an embodiment of the client 102, server 106 or appliance 200. As shown in FIGS. 1C and 1D, each computing device 100 includes a central processing unit 101, and a main memory unit 122. As shown in FIG. 1C, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1C, the processor 101 communicates with main memory 122 via a system bus 150 (described in more detail below). FIG. 1C depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1C, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1D depicts an embodiment of a computer 100 in which the main processor 101 communicates directly with I/O device 130 via HyperTransport, Rapid I/O, or InfiniBand. FIG. 1D also depicts an embodiment in which local busses and direct communication are mixed: the processor 101 communicates with I/O device 130 using a local interconnect bus while communicating with I/O device 130 directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein. A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1C. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1C and 1D typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

B. Appliance Architecture

Figure 2A:
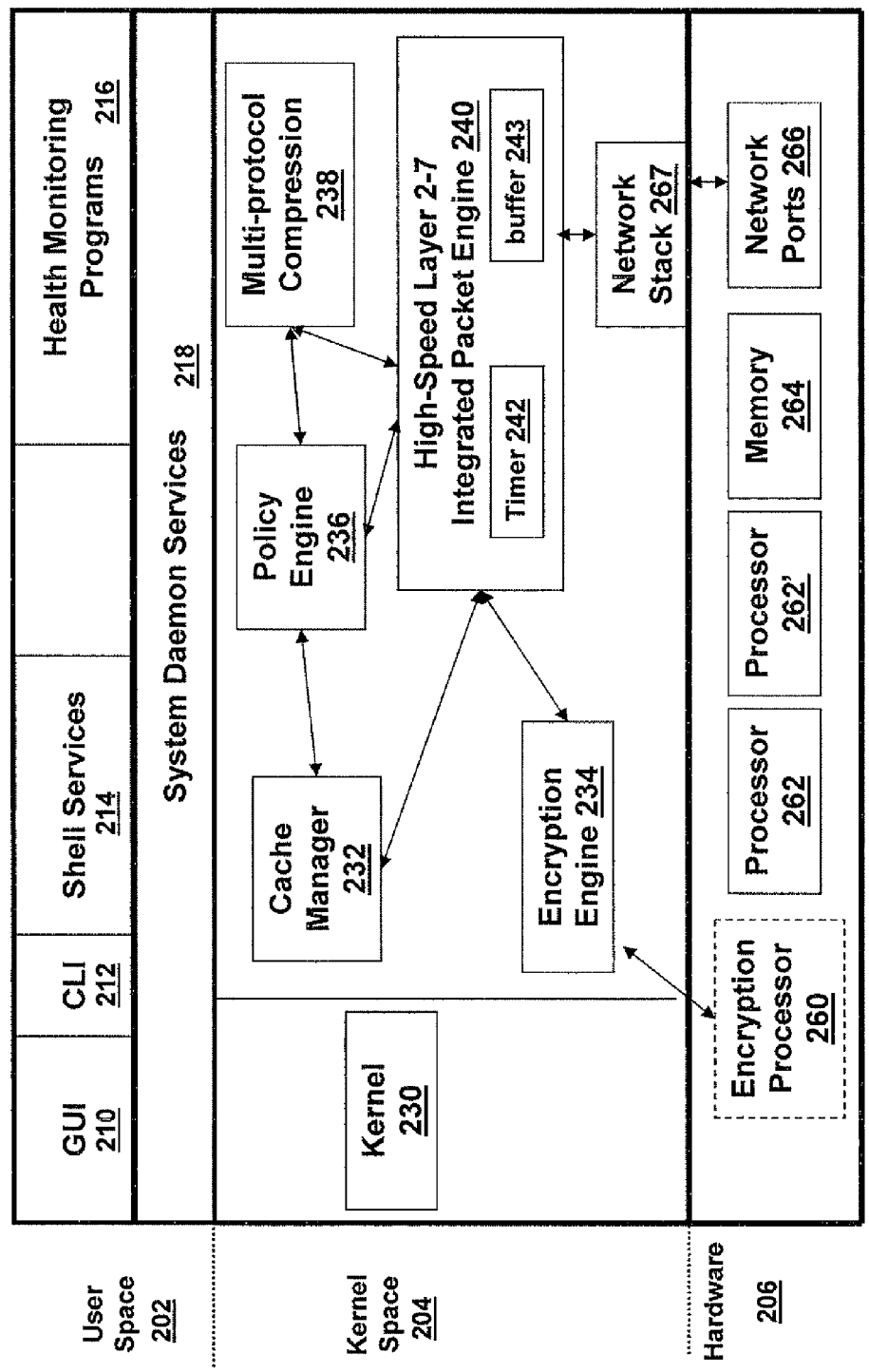
FIG. 2A is a block diagram of an embodiment of an appliance for processing communications between a client and a server.

FIG. 2A illustrates an example embodiment of the appliance 200. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1C and 1D. In some embodiments, the central processing unit 262 may perform the functions of the encryption processor 260 in a single processor. Additionally, the hardware layer 206 may comprise multiple processors for each of the processing unit 262 and the encryption processor 260. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may be have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1C and 1D. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of Unix operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232. sometimes also referred to as the integrated cache, the benefits of which are described in detail further herein. Additionally, the embodiment of the kernel 230 will depend on the embodiment of the operating system installed, configured, or otherwise used by the device 200.

In one embodiment, the device 200 comprises one network stack 267, such as a TCP/IP based stack, for communicating with the client 102 and/or the server 106. In one embodiment, the network stack 267 is used to communicate with a first network, such as network 108, and a second network 110. In some embodiments, the device 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the device 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element that comprise a data object in memory 264 of device 200. In other embodiments, the cache memory element may comprise memory having a faster access time than memory 264. In another embodiment, the cache memory element may comprise any type and form of storage element of the device 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application(s). In one embodiment, the policy engine 236 provides a configuration mechanism to allow a user to identifying, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the device 200. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packer. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms.

In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200 and either is user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Figure 2B:
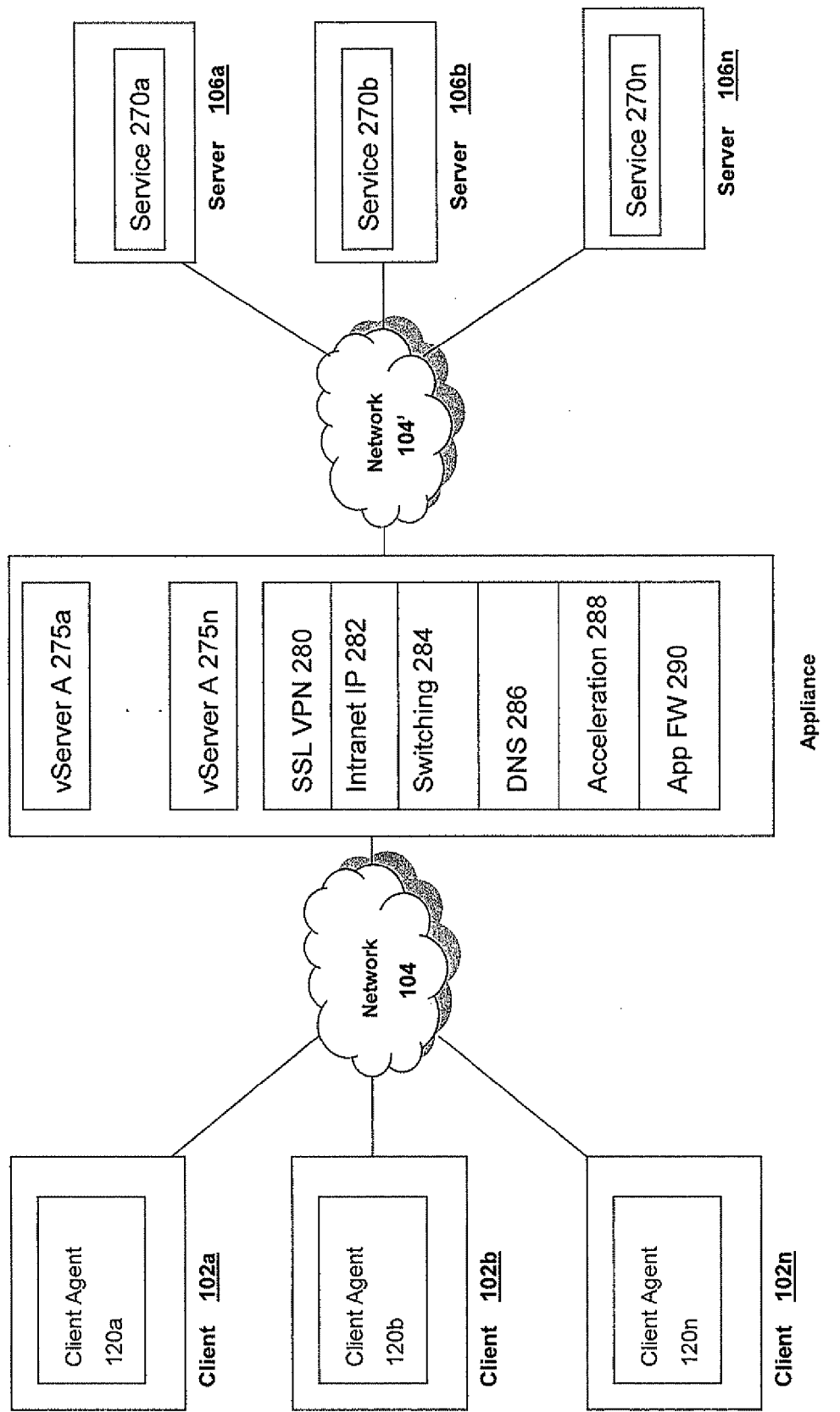
FIG. 2B is a block diagram of another embodiment of an appliance for optimizing, accelerating, load-balancing and routing communications between a client and a server.

Referring now to FIG. 2B, another embodiment of the appliance 200 is depicted. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. In one embodiment, the appliance 200 comprises any of the network devices manufactured by Citrix Systems, Inc. of Ft. Lauderdale Fla., referred to as Citrix NetScaler devices. Each of the servers 106 may provide one or more network related services 270a-270n (referred to as services 270). For example, a server 106 may provide an http service 270. The appliance 200 comprises one or more virtual servers or virtual internet protocol servers, referred to as a vServer, VIP server, or just VIP 275a-275n (also referred herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL VPN 280, switching/load balancing 284, Domain Name Service resolution 286, acceleration 288 and an application firewall 290. In some embodiments, the vServer 275 establishes a connection to a service 270 of a server 106. The service 275 may comprise any program, application, process, task or set of executable instructions capable of connecting to and communicating to the appliance 200, client 102 or vServer 275. For example, the service 275 may comprise a web server, http server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vServer 275 applies one or more policies of the policy engine 236 to network communications between the client 102 and server 106. In one embodiment, the policies are associated with a VServer 275. In another embodiment, the policies are based on a user, or a group of users. In yet another embodiment, a policy is global and applies to one or more vServers 275a-275n, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 103 In one embodiment, the appliance 102 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a TCP or UDP connection with a client 102 via the client agent 120. In one embodiment, the vServer 275 listens for and receives communications from the client 102. In other embodiments, the vServer 275 establishes a transport layer connection, such as a TCP or UDP connection with a client server 106. In one embodiment, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of transport layer connections to a server 106 and multiplexes client requests via the pooled transport layer connections.

In some embodiments, the appliance 200 provides a SSL VPN connection 280 between a client 102 and a server 106. For example, a client 102 on a first network 102 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In one embodiment, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 102, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

In one embodiment, the appliance 200 hosts an intranet internet protocol or intranetIP 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP, which is network identifier, such as IP address and/or host name, for the client 102 on the second network 104'. The appliance 200 listens for and receives on the second or private network 104' for any communications directed towards the client 102 using the client's established IntranetIP 282. In one embodiment, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching. In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In one embodiment, although the network layer or layer 2 of the network packet identifies a destination server 106, the appliance 200 determines the server 106 to distribute the network packet by application information and data carried as payload of the transport layer packet. In one embodiment, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts' a DNS request transmitted by the client 102. In one embodiment, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In one embodiment, the policy engine 236 provides rules for detecting and blocking illegitimate requests. In some embodiments, the application firewall 290 protects against denial of service (DoS)

attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 290 may take a policy action on the network communication, such as prevent transmission of the network communication. In another embodiment, the application firewall 290 may rewrite, remove or otherwise mask such identified occurrence or confidential information.

C. Client Agent

Figure 3:
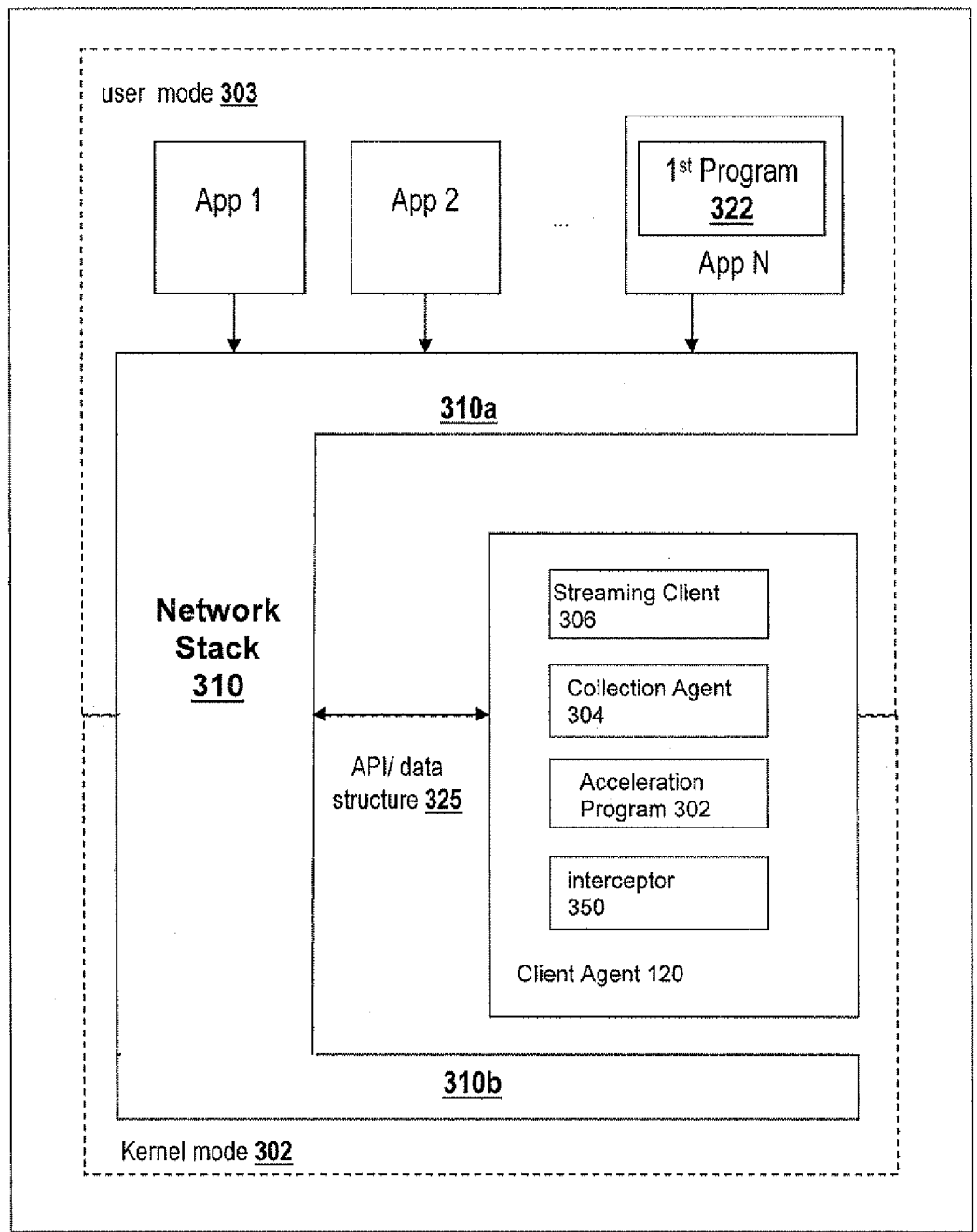
FIG. 3 is a block diagram of an embodiment of a client for communicating with a server via the appliance.

Referring now to FIG. 3, an embodiment of the client agent 120 is depicted. The client 102 includes a client agent 120 for establishing and exchanging communications with the appliance 200 and/or server 106 via a network 104. In brief overview, the client 102 operates on computing device 100 having an operating system with a kernel mode 302 and a user mode 303, and a network stack 310 with one or more layers 310a-310b. The client 102 may have installed and/or execute one or more applications. In some embodiments, one or more applications may communicate via the network stack 310 to a network 104. One of the applications, such as a web browser, may also include a first program 322. For example, the first program 322 may be used in some embodiments to install and/or execute the client agent 120, or any portion thereof. The client agent 120 includes an interception mechanism, or interceptor 350, for intercepting network communications from the network stack 310 from the one or more applications.

The network stack 310 of the client 102 may comprise any type and form of software, or hardware, or any combinations thereof, for providing connectivity to and communications with a network. In one embodiment, the network stack 310 comprises a software implementation for a network protocol suite. The network stack 310 may comprise one or more network layers, such as any networks layers of the Open Systems Interconnection (OSI) communications model as those skilled in the art recognize and appreciate. As such, the network stack 310 may comprise any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 310 may comprise a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 310 comprises any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 310 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 310, such as for voice communications or real-time data communications.

Furthermore, the network stack 310 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 310 may be customized, modified or adapted to provide a custom or modified portion of the network stack 310 in support of any of the techniques described herein. In other embodiments, the acceleration program 120 is designed and constructed to operate with or work in conjunction with the network stack 310 installed or otherwise provided by the operating system of the client 102.

The network stack 310 comprises any type and form of interfaces for receiving, obtaining, providing or otherwise accessing any information and data related to network communications of the client 102. In one embodiment, an interface to the network stack 310 comprises an application programming interface (API). The interface may also comprise any function call, hooking or filtering mechanism, event or call back mechanism, or any type of interfacing technique. The network stack 310 via the interface may receive or provide any type and form of data structure, such as an object, related to functionality or operation of the network stack 310. For example, the data structure may comprise information and data related to a network packet or one or more network packets. In some embodiments, the data structure comprises a portion of the network packet processed at a protocol layer of the network stack 310, such as a network packet of the transport layer. In some embodiments, the data structure 325 comprises a kernel-level data structure, while in other embodiments, the data structure 325 comprises a user-mode data structure. A kernel-level data structure may comprise a data structure obtained or related to a portion of the network stack 310 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 310 may execute or operate in kernel-mode 302, for example, the data link or network layer, while other portions execute or operate in user-mode 303, such as an application layer of the network stack 310. For example, a first portion 310a of the network stack may provide user-mode access to the network stack 310 to an application while a second portion 310a of the network stack 310 provides access to a network. In some embodiments, a first portion 310a of the network stack may comprise one or more upper layers of the network stack 310, such as any of layers 5-7. In other embodiments, a second portion 310b of the network stack 310 comprises one or more lower layers, such as any of layers 1-4. Each of the first portion 310a and second portion 310b of the network stack 310 may comprise any portion of the network stack 310, at any one or more network layers, in user-mode 203, kernel-mode, 202, or combinations thereof, or at any portion of a network layer or interface point to a network layer or any portion of or interface point to the user-mode 203 and kernel-mode 203.

The interceptor 350 may comprise software, hardware, or any combination of software and hardware. In one embodiment, the interceptor 350 intercept a network communication at any point in the network stack 310, and redirects or transmits the network communication to a destination desired, managed or controlled by the interceptor 350 or client agent 120. For example, the interceptor 350 may intercept a network communication of a network stack 310 of a first network and transmit the network communication to the appliance 200 for transmission on a second network 104. In some embodiments, the interceptor 350 comprises any type interceptor 350 comprises a driver, such as a network driver constructed and designed to interface and work with the network stack 310. In some embodiments, the client agent 120 and/or interceptor 350 operates at one or more layers of the network stack 310, such as at the transport layer. In one embodiment, the interceptor 350 comprises a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In one embodiment, the interceptor 350 may comprise a driver complying with the Network Driver Interface Specification (NDIS), or a NDIS driver. In another embodiment, the interceptor 350 may comprise a min-filter or a mini-port driver. In one embodiment, the interceptor 350, or portion thereof, operates in kernel-mode 202. In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In one embodiment, the interceptor 350 intercepts any transport layer connection requests. In these embodiments, the interceptor 350 execute transport layer application programming interface (API) calls to set the destination information, such as destination IP address and/or port to a desired location for the location. In this manner, the interceptor 350 intercepts and redirects the transport layer connection to a IP address and port controlled or managed by the interceptor 350 or client agent 120. In one embodiment, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In one embodiment, the client agent 120 and/or interceptor 350 resolves the DNS request. In another embodiment, the interceptor transmits the intercepted DNS request to the appliance 200 for DNS resolution. In one embodiment, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may comprise two agents 120 and 120'. In one embodiment, a first agent 120 may comprise an interceptor 350 operating at the network layer of the network stack 310. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 310. For example, in one embodiment, the interceptor 350 operates or interfaces with the transport layer of the network stack 310 transparently to any protocol layer below the transport layer, such as the network layer, and any protocol layer above the transport layer, such as the session, presentation or application layer protocols. This allows the other protocol layers of the network stack 310 to operate as desired and without modification for using the interceptor 350. As such, the client agent 120 and/or interceptor 350 can interface with the transport layer to secure, optimize, accelerate, route or load-balance any communications provided via any protocol carried by the transport layer, such as any application layer protocol over TCP/IP.

Furthermore, the client agent 120 and/or interceptor may operate at or interface with the network stack 310 in a manner transparent to any application, a user of the client 102, and any other computing device, such as a server, in communications with the client 102. The client agent 120 and/or interceptor 350 may be installed and/or executed on the client 102 in a manner without modification of an application. In some embodiments, the user of the client 102 or a computing device in communications with the client 102 are not aware of the existence, execution or operation of the client agent 120 and/ or interceptor 350. As such, in some embodiments, the client agent 120 and/or interceptor 350 is installed, executed, and/or operated transparently to an application, user of the client 102, another computing device, such as a server, or any of the protocol layers above and/or below the protocol layer interfaced to by the interceptor 350.

The client agent 120 includes an acceleration program 302, a streaming client 306, and/or a collection agent 304. In one embodiment, the client agent 120 comprises an Independent Computing Architecture (ICA) client, or any portion thereof, developed by Citrix Systems, Inc. of Fort Lauderdale, Fla., and is also referred to as an ICA client. In some embodiments, the client 120 comprises an application streaming client 306 for streaming an application from a server 106 to a client 102. In some embodiments, the client agent 120 comprises an acceleration program 302 for accelerating communications between client 102 and server 106. In another embodiment, the client agent 120 includes a collection agent 304 for performing end-point detection/scanning and collecting end-point information for the appliance 200 and/or server 106.

In some embodiments, the acceleration program 302 comprises a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 302 may perform one or more of the following acceleration techniques: 1) multi-protocol compression, 2) transport control protocol pooling, 3) transport control protocol multiplexing, 4) transport control protocol buffering, and 5) caching via a cache manager. Additionally, the acceleration program 302 may perform encryption and/or decryption of any communications received and/or transmitted by the client 102. In some embodiments, the acceleration program 302 performs one or more of the acceleration techniques in an integrated manner or fashion. Additionally, the acceleration program 302 can perform compression on any of the protocols, or multiple-protocols, carried as a payload of a network packet of the transport layer protocol.

The streaming client 306 comprises an application, program, process, service, task or executable instructions for receiving and executing a streamed application from a server 106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archives In one embodiment, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In one embodiment, the streaming client 306 may be an executable program. In some embodiments, the streaming client 306 may be able to launch another executable program.

The collection agent 304 comprises an application, program, process, service, task or executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In one embodiment, the policy engine 236 of the appliance 200 uses the collected information to determine and provide access, authentication and authorization control of the client's connection to a network 104.

In one embodiment, the collection agent 304 comprises an end-point detection and scanning mechanism, which identifies and determines one or more attributes or characteristics of the client. For example, the collection agent 304 may identify and determine any one or more of the following client-side attributes: 1) the operating system an/or a version of an operating system, 2) a service pack of the operating system, 3) a running service, 4) a running process, and 5) a file. The collection agent 304 may also identify and determine the presence or versions of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

In some embodiments and still referring to FIG. 3, a first program 322 may be used to install and/or execute the client agent 120, or portion thereof, such as the interceptor 350, automatically, silently, transparently, or otherwise. In one embodiment, the first program 322 comprises a plugin component, such an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In one embodiment, the first program 322 comprises a designed and constructed program to install the client agent 120. In some embodiments, the first program 322 obtains, downloads, or receives the client agent 120 via the network from another computing device. In another embodiment, the first program 322 is an installer program or a plug and play manager for installing programs, such as network drivers, on the operating system of the client 102.

D. Hierarchical Global Load Balancing

Figure 4A:
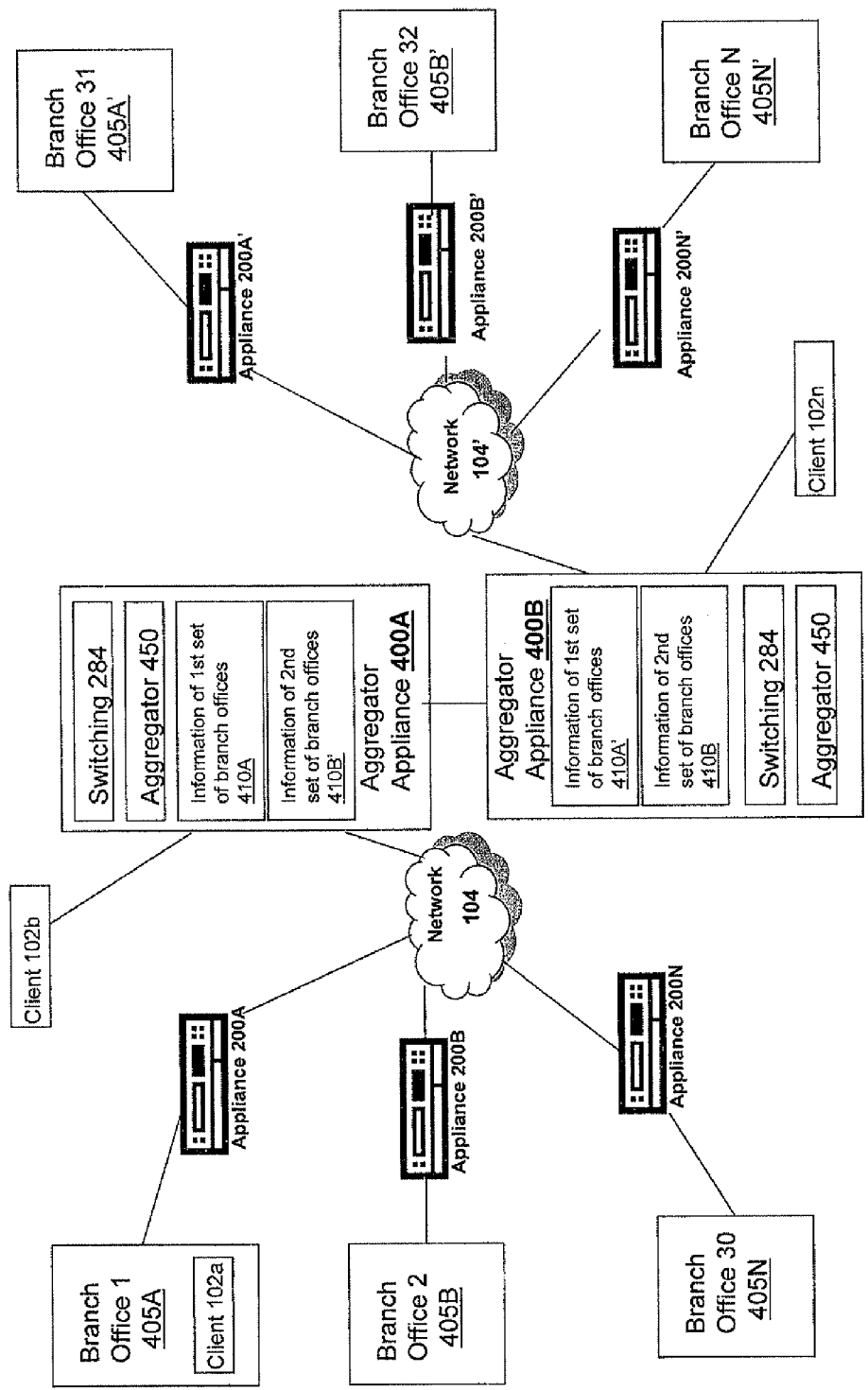
FIG. 4A is a block diagram of an embodiment of aggregator appliances to access resources across branch offices.

Referring now to FIG. 4A, an embodiment of a hierarchy of aggregator appliances 400A-400B (also referred herein as aggregator appliance 400) for load balancing resources across branch offices is depicted. In brief overview, a first aggregator appliance 400A is connected to a first set of branch office appliances 200A-200N (also referred herein as branch office appliance 200) providing services to branch offices 405A-405N. A second aggregator appliance 400B is connected to a second set of branch office appliances 200A'-200N' providing services to branch offices 405A'-405N'. The first aggregator appliance 405A and the second aggregator appliance 400B establish connections with each other to communicate information 410A, 410A' and 410B, 410B' on performance and operational characteristics of respective branch office appliances. With this information 410, 420, either of the aggregator appliances 400A-400N can perform load balancing/switching 284 to select a branch office appliance 200 from the first set of branch office appliances 200A-200N or the second set of branch office appliances 200A'-200N' to service requests to access resources from a client 102.

Any of the branch office appliances 200A-200N or 200A'-200N' may be configured to know of or identify a single aggregator appliance 400. For example, a first branch office appliance 200A may be configured to identify and connect to the first aggregator appliance 400A. The first branch office appliance 200A may not be configured to have any information and therefore may not know of the second aggregator appliance 400B or any branch office appliances 200A'-200N' connected to the second aggregator appliance 400B. In this manner, the configuration of branch office appliance 200 is reduced. Even though the configuration is reduced, a branch office appliance servicing a request may access any of the other appliances 200A-200N' known to an aggregator appliance 400. Since the aggregator appliances 400A-400B share information on branch office appliance 200A-200N', a first aggregator appliance 200 can identify to a first branch office appliance 200 information identifying any of the branch office appliances 200A-200N' connected via any of the aggregator appliances 400A-400B.

In some embodiments, the branch office appliances 200 provide any of the functionality, operations and services of an appliance 200 described in conjunction with FIGS. 2A and 2B. The branch office appliances 200A'-200N' provide acceleration 288, load balancing/switching 284, SSL VPN 280 and/or application firewall services 290 to any of the computing devices and users of its respective branch office 405A'-405N'. The branch office appliances 200A-200N provide acceleration 288, load balancing 284, switching, SSL VPN 280 and/or application firewall services 290 to any of the computing devices and users of its respective branch office 405A-405N. In one embodiment, each of the branch office appliances 200A'-200N' provide the same functionality, operations and service. In other embodiments, each of the branch office appliance 200 may provide different functionality, operations or services than another branch office appliance. For example, a first branch office appliance 200A may provide for SSL VPN 280 and acceleration 288, and a second branch office appliance 200A' may provide load balancing/switching 284 with SSL VPN 280. A third branch office appliance 200N may provide only SSL VPN 280 and a fourth branch office appliance 200N, acceleration 288. Further to the example, a fifth branch office appliance 200B may provide acceleration 288 while a sixth branch office appliance 200C provides application firewall 290 functionality.

Although branch office appliances 200 are generally described as an appliance 200 in a branch office 405, the branch office appliance 200 may be an appliance 200 deployed at any location in a network 104, 105'. For example, a branch office appliance 200 may be deployed at a data center. In another example, a branch office appliance 200 may be deployed on a subnet or network segment of a corporate LAN 104. In another embodiment, a branch office appliance 200A may be deployed on a first corporate LAN and a second branch office appliance 200B' on a second corporate LAN. In some embodiments, a branch office appliance 200 may be deployed on the same network 104, 104' as an aggregator appliance 400. So, although the appliance 200 is described in FIG. 4A as a branch office appliance 200, it is not limited to operations only at a branch office 405.

The aggregator appliance 400 comprises software, hardware or any combination of software and hardware. In one embodiment, the aggregator appliance 400 comprises logic, functions or operations, such as via the aggregator 450, to determine, collect and aggregates information 410 about one or more branch office appliances 200. For example, the information 410 may comprise information on the status, load or performance of a branch office appliance 200. In one embodiment, the aggregator 450 comprises an application, process, service, task or set of executable instructions. The aggregator 450 comprises any type, form and combination of data structures, objects, files and/or databases for receiving and storing information 410 about any of the branch office appliances 200. In some embodiments, the aggregator 450 stores the information 410 in an organized or arranged manner associated with or identified by a name or identifier of the branch office appliance 200. For example, the information 410 may be indexed via an identifier of the appliance 200. In some embodiments, the aggregator 450 stores or associates temporal data with the information 410, such as time of recording or time related to an event.

In one embodiment, the aggregator appliance 400 and/or aggregator 450 receive information 410 from the branch office appliance via a connection. In some embodiments, the aggregator appliance 400 and a branch office appliance 200 establish or communicate via a transport layer connection, such as a TCP or UDP connection. In other embodiments, the aggregator appliance 400 and branch office appliance 200 maintain a connection. In other embodiments, the aggregator appliance 400 and branch office appliance 200 establish a connection on an as needed basis, e.g., connect and reconnect when they need to communicate.

In some embodiments, the aggregator appliance 400 establishes a connection or communicates with a predetermined number of branch office appliances 200. In other embodiments, the aggregator appliance 400 collects and aggregates information on a predetermined number of branch office appliances 200. In one embodiment, the predetermined number of branch offices is 31. In another embodiments, the predetermined number of branch offices is 32. In yet other embodiments, the predetermined number of branch offices is 16, 48, 60, 96, 128 or 256. In a further embodiment, the predetermined number of branch offices is 10, 20, 30, 40, 50, 60, 70, 80, 90, 100, 150, 200 or 250. The number of branch offices an aggregator appliance 400 may connect to or collect information from may depend on the operational or performance characteristics of the networks 104, 104', the appliance 200, the branch offices 405, and branch office networks 104 along with the applications, data, and resource usage of the users across branch offices. In some embodiments, the predetermined number of branch office appliance 200 may not be set or configured, or otherwise limited only by the memory, capacity and performance of the aggregator appliance 400.

In another embodiment, the aggregator appliance 400 requests information 410 from each of the branch office appliance 200 it is connected to. In some embodiments, the aggregator appliance 400 requests information upon establishment of the connection to the branch office appliance 200. In another embodiment, the aggregator appliance 400 requests information 410 from the branch office appliance 200 on a predetermined frequency, such as every 1 sec, or 1 msec. For example, the aggregator appliance 400 may poll each of its branch office appliances 200A-200N every 1 sec for information 410. In some embodiments, the aggregator appliance 400 requests information 410 from the branch office appliance 200 over a predetermined time period, such as every 1 sec for an hour. In yet another embodiment, the aggregator appliance 400 requests information 410 from a branch office appliance 200 upon an event, such as receiving a request from a client 102, or receiving a DNS request.

The information 410 may comprise any type and form of data, statistics, status or information related to or associated with the operational and/or performance characteristics of the branch office appliance 200, the network 104 of the branch office appliance 200, and/or any connection to the branch office appliance 200, such as via a client 102, server 106 or the aggregator appliance 400. In some embodiments, the information 410 comprises operational and/or performance data on any client 102 and/or server 106 connected to the branch office appliance 200. In one embodiment, the branch office appliance 200 determines operational and/or performance information about any client 102 or server 106 it is connected to or servicing, and creates information 410 on these clients 102 and/or server 106. In this embodiment, the branch office appliance 200 may provide this information 410 to the aggregator appliance 400.

In some embodiments, the operational and/or performance characteristic information 410 includes information on any of the following for a branch office appliance 200, client 102 or server: 1) load; 2) numbers and types of connections, 3) resource usage, 4) resource availability, 5) number of requests outstanding, 6) number of requests transmitted, 7) number of clients servicing, 8) response time information, including average and historical response times, 9) errors, status, performance or bandwidth of a connection, and 10) number of sessions, and states or status thereof. In another embodiment, the information 410 includes information on any IP or network layer information of the appliance 200, or the connections of the appliance 200, or of the clients and/or servers serviced by the appliance 200. For example, the information 410 may include a routing table of the appliance 200 for performing network address translation, such as for an SSL VPN connection.

Each of the aggregator appliances 400A-400B may share or otherwise communicate the aggregated information 410 with the other aggregator appliance. The first aggregator appliance 400A establishes a connection, such as a TCP or UDP transport layer connection with the second aggregator appliance 400B. In one embodiment, the second aggregator appliance 400B uses this connection. In another embodiment, the second aggregator appliance 400B establishes a connection, such as a TCP or UDP transport layer connection, to the first aggregator appliance 400A. In one embodiment, the aggregator appliances 400A-400B may establish a connection or communication channel with each other upon bootup or startup. In other embodiments, the aggregator appliances 400A-400B may establish connections upon a configuration change or event. In another embodiment, the aggregator appliances 400A-400B may send out a broadcast on the network 104 to determine the existence or availability of another aggregator appliance 400.

In one embodiment, the first aggregator appliance 400A transmits its information 410A to the second aggregator appliance 400B. The second aggregator appliance 400B stores the received information 410A as information 410A' as illustrated in FIG. 4A. In some embodiments, information 410A' is aggregated or combined with information 410A. In other embodiments, information 410A' is associated with information 410A. In another embodiment, the second aggregator appliance 400B transmits its information 410B to the first aggregator appliance 400A. The first aggregator appliance 400A stores the received information 410B as information 410B' as illustrated in FIG. 4A. In some embodiments, information 410B' is aggregated or combined with information 410B. In other embodiments, information 410B' is associated with information 410B. The first and second aggregator appliances 400A-400B may exchange or provide information 410A and 410B once, or on a predetermined frequency, such as every 1 msec or 1 sec. In some embodiments, the first and second aggregator appliances 400A-400B use a request/reply messaging mechanism or protocol to transmit information 410A-410B to each other. In other embodiments, the first and second aggregator appliances 400A-400B have a custom or proprietary exchange protocol for exchanging information 410A-410B about branch office appliances 200A-200N'.

By exchanging information 410A-410B, each of the first aggregator appliance 400A and second aggregator appliance 400B have information 410A and 410B on both the first set of one or more branch office appliances 200A-200N and the second set of one or more branch office appliances 200A'-200N'. Although the first aggregator appliance 400A is collecting, aggregating and monitoring information 410A about the branch office appliances 200A-200N, the first aggregator appliance 400A obtains information 410B about the branch office appliances 200A'-200N' collected, aggregated and monitored by the second aggregator appliance 400B. Likewise, although the second aggregator appliance 400B is collecting, aggregating and monitoring information 410B about the branch office appliances 200A'-200N', the second aggregator appliance 400B obtains information 410A about the branch office appliances 200A-200N collected, aggregated and monitored by the first aggregator appliance 400A.

With the aggregator appliances 400A-400B, a first branch office appliance 200A, in one embodiment, need only know the identity or internet protocol information of the first aggregator appliance 400A, but obtains the identify other branch office appliances 200A'-200N' via the aggregator appliance 400A. For example, upon receiving a request from a client for a resource, the first branch office appliance 200A may forward the request to the aggregator appliance 400a. In response, the aggregator appliance 400A may transmit the identity of a branch office appliance 200A'-200N' monitored by aggregator appliance 400B in order to service the request. In some embodiments, this simplifies the configuration of each or any of the branch office appliances 200, yet, at the same time, allows any branch office appliance 200A-200N to access the services of or connect to a resource via another branch office appliance 200A'-200N'. In this way, clients can access resources across any of the branch offices 405A-405N via any of the branch office appliances 200A-200N' using the information 410A-410B collected via the aggregator appliances 400A-400B. In other embodiments, a client 102 can connect directly to any of the aggregators 400A-400N and get load balanced to any of the branch office appliances 200.

The aggregator appliances 400A-400B comprises load-balancing/switching 284 functionality, operations and/or logic for determining and providing load-balancing services to any of the branch office appliances 200, clients 102 of the branch offices 405, or servers 106 accessed via the branch offices 405 or branch office appliances 200. Using the information 410A and 410B', in one embodiment, the first aggregator appliance 400A can determine a branch office appliance 200 from any of the branch office appliances 200A-200N' to service a request from a client 102. Using the information 410A' and 410B, in another embodiment, the first second appliance 400B can determine a branch office appliance 200 from any of the branch office appliances 200A-200N' to service a request from a client 102. Additionally, the aggregator appliances 400A-400N can use information 410A, 410N to determine a resource, such as server 106, access via a branch office appliance 200 to service a request. In this manner and in some embodiments, the aggregator appliances 400A-440N provide load-balancing and switching information for the aggregation of all resources and branch office appliances 200A-200N across all the branch office 405A-405N'.

The aggregator appliance 400, in some embodiments, comprises any of the functionality, operations or services of a branch office appliance 200. For example, in addition to the load balancing 284 and aggregation operations of the aggregator appliance 400 described herein, the aggregator appliance may perform acceleration, SSL VPN or application firewall functionality. The first aggregator appliance 400A and the second aggregator appliance 400B may be deployed on the same network 104 and/or different networks 104, 104'. In some embodiments, additional aggregator appliances 400 may be deployed to scale up to service a plurality of branch offices 405 and branch office appliances 200.

Figure 4B:
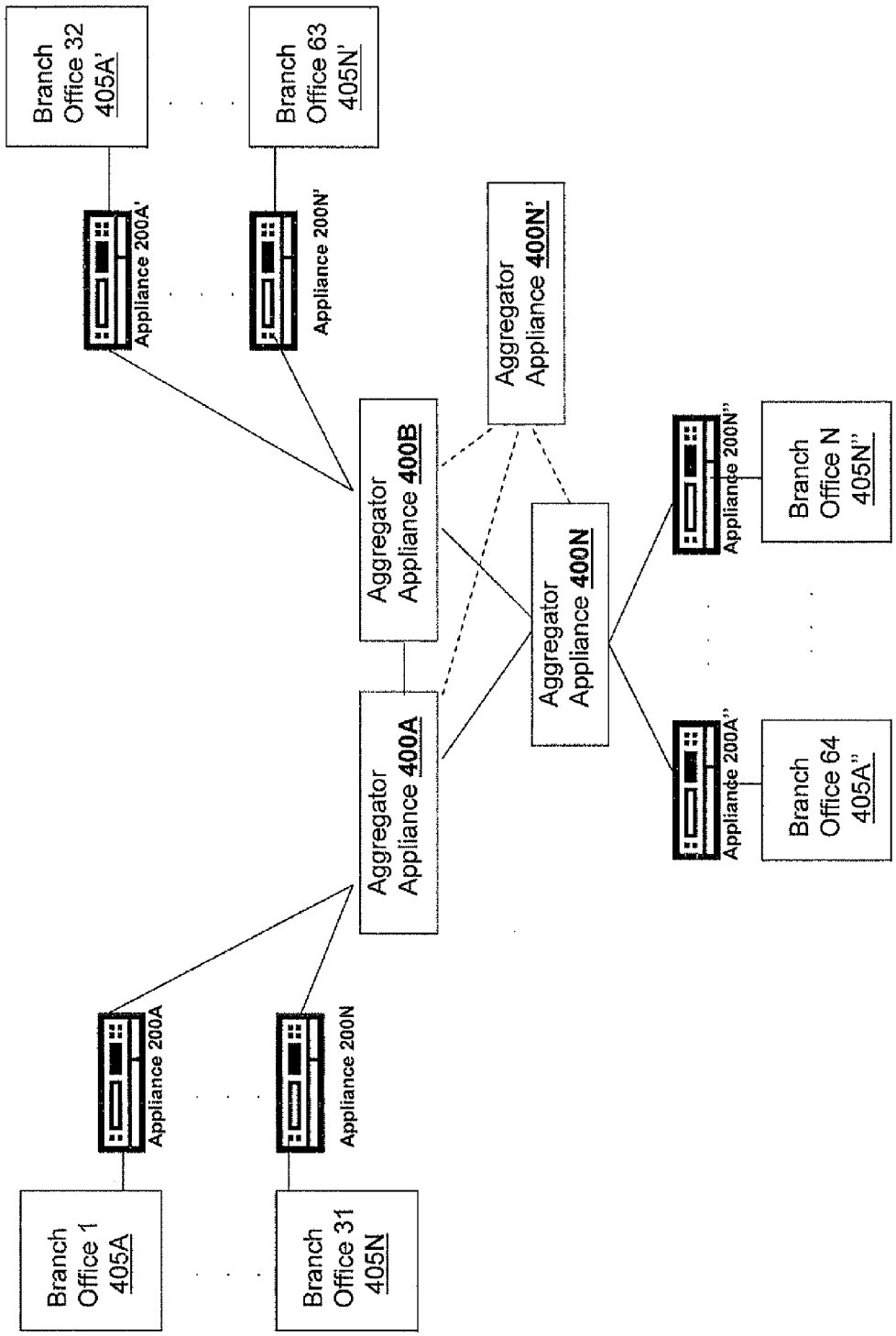
FIG. 4B is a block diagram of another embodiment of a deployment of aggregator appliances to load balance a plurality of branch offices.

Referring now to FIG. 4B, another embodiment of a deployment of multiple aggregator appliances is depicted. In brief overview, a plurality of aggregator appliances 400A, 400B and 400N are deployed to provide aggregation and/or load-balancing services to a plurality of branch offices: branch offices 1-31 405A-405N, branch offices 32-63 405A'-405N, and branch offices 64-N 405A"-405N". The first aggregator appliance 400A is connected to and obtains information 410 on a first set of one or more branch office appliances 405A-405N. The second aggregator appliance 400B is connected to and obtains information 410 on a second set of one or more branch office appliances 405A'-405N'. The third aggregator appliance 400N is connected to and obtains information 410 on a third set of one or more branch office appliances 405A"-405N".

Each of the aggregator appliances 400A-400N can exchange information 410 with each other to identify, learn about and obtain information 410 on other branch office appliances 200A-220N, 200A'-200N' and 200A"-200N"". In one embodiment, the first aggregator appliance 400A establishes a connection with the second aggregator appliance 400B and third aggregator appliance 400N. In another embodiment, the second aggregator appliance 400B establishes a connection with the first aggregator appliance 400A and third aggregator appliance 400N. In yet another embodiment, the third aggregator appliance 400N establishes a connection with the second aggregator appliance 400B and first aggregator appliance 400A. Through any of these connections, the aggregator appliances 400 can ask, receive, transmit, or otherwise obtain information 410 on a set of one or more branch office appliances 200 to which it may not be currently connected.

In some embodiments, each of the aggregator appliances 400 may be connected to, obtain and monitor information 410 on a number of branch office appliances 200 different than another aggregator appliance 400. For example, the first aggregator appliance 400A may monitor and obtain information 410 on 2, 3, 4, 5 or 10 appliances 200 while the second aggregator appliance 200 monitors and obtains information 410 on 20, 30 or 31 appliances 200. Further to the example, the third aggregator appliance 400C may monitor and obtain information 410 on a single branch office appliance 200 or any number of branch office appliances 200. Although the deployment illustrated in FIG. 4B depicts three aggregator appliances 400A-400N servicing three sets of multiple branch offices, any number of aggregator appliances 400 may be deployed to service any number of branch offices 405.

In one embodiment, an aggregator appliance, such as aggregator appliance 400N', depicted with dotted connected lines in FIG. 4B may be used as a master aggregator node or appliance 400. For example, in some embodiments, the master aggregator appliance 400N' may not collect information 410 from branch office appliances 200 directly, but instead aggregates the information 410 from the other aggregator appliances 400A-400N that collected such information. In some embodiments, the master aggregator appliance 400N acts as a backup service to any of the other aggregator appliances 400. For example, in one case, if an aggregator appliance 400A went down or was rebooted, upon startup the aggregator appliance 400A can obtain the latest saved information 410 from the master aggregator appliance 400N'. In other embodiments, each of the aggregator appliance 400A-400N establish a connection with the master aggregator appliance 400N' to provide or update the information 410 on the master aggregator appliance 400N' and/or to also obtain information 410 from the other appliances 400 it may not yet have.

With the deployment architecture illustrated in FIG. 4B, in some embodiments, any number of aggregator appliances 400 can be deployed to scale load-balancing and aggregation services to any number of branch offices 405. As the number of branch offices 405 and/or branch office appliances 200 increases, the configuration of a branch office appliance 200 remains relatively simple in that it needs only to be configured to know of an existing aggregator appliance 400A or a newly deployed aggregator appliance 400N. Through the aggregation and exchanging of information 410 among the aggregation appliances 200, any client or branch office appliance 200 can access resources across any of the branch offices 405.

Figure 5:
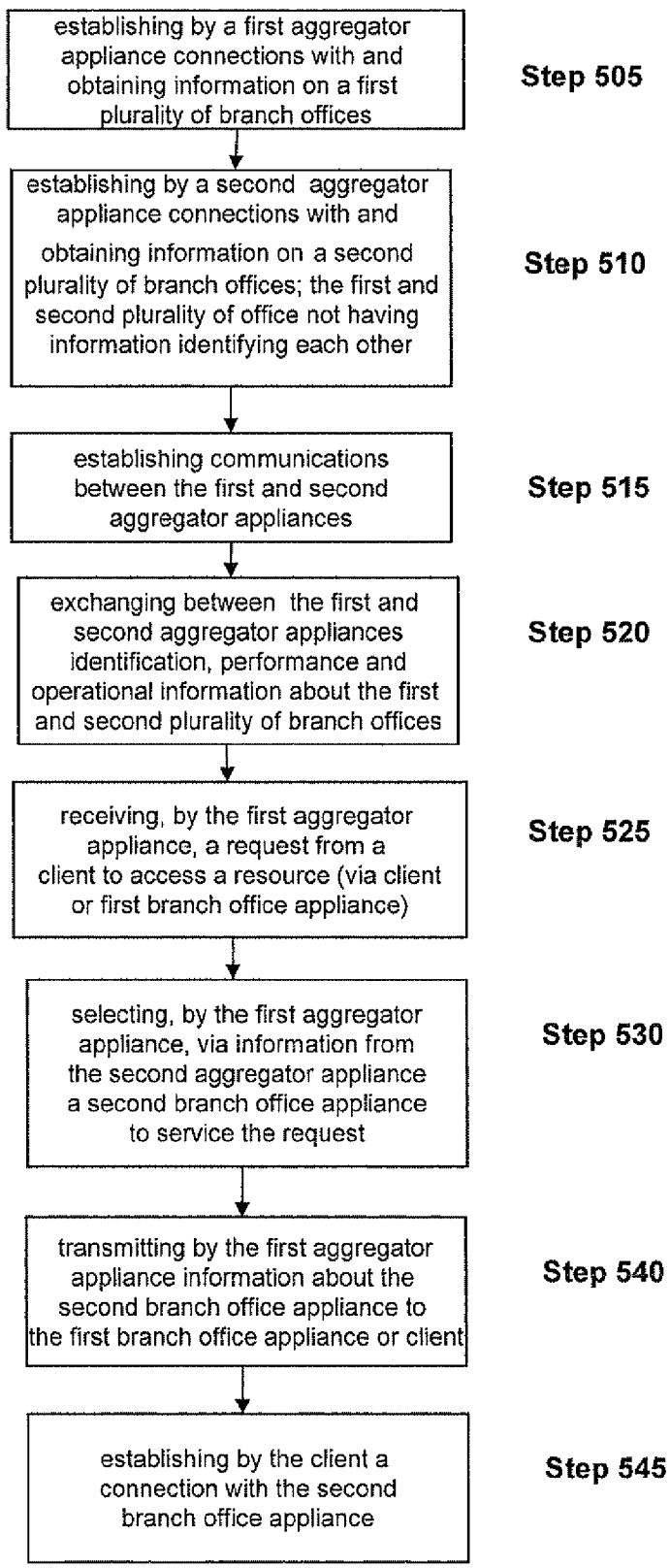
FIG. 5 is a flow diagram of steps of an embodiment of a method for practicing hierarchical load balancing with aggregator appliances to access resources across branch offices.

Referring now to FIG. 5, steps of an embodiment of a method 500 for practicing aggregations and load-balancing via the aggregation appliances 400 is depicted. In brief overview, at step 505, a first aggregator appliance 405A establishes connections with and obtains information 410A on a first plurality of branch office appliances 200A-200N. At step 510, a second aggregator appliance 410A establishes connections with and obtains information 410B a second plurality of branch offices 200A'-200N'. One or more of the first set of branch office appliances 200A-200N may not have any information or be configured to identify any of the second set of branch office appliances 200A'-200N'. At step 515, the first and second aggregator appliances 400A-400B establish a connection or communication between each other. At step 520, the first and second aggregator appliances 400A-400N exchange identification, operational and performance information 410 about the first and second set of branch office appliances 200. At step 525, a first aggregator appliance 400A receives a request from a client 102 to access a resource. For example, a first branch office appliance 200A may transmit the request to the first aggregator appliance 400A, such a for client 102a depicted in FIG. 4A. In another example, a client 102 may transmit the request to an aggregator appliance 400A, such as clients 102b and 102n as illustrated in FIG. 4A. At step 530, the first aggregator appliance selects via information 410 received from the second aggregator appliance 400B a second branch office appliance 200A' from the second set of branch office appliances 200A'-200N' to service the request. At step 540, the first aggregator appliance 200 transmits the information on the selected second branch office appliance 200A' to the client 102, directly or via a first branch office appliance 200A servicing the client 102. At step 545, the client 102 establishes a connection with the second branch office appliance 200A', directly or via the first branch office appliance 200A.

In further detail, at step 505, a first aggregator appliance 200A establishes any type and form of connection to one or more branch office appliances 200A-200N. In one embodiment, the first aggregator appliance 200A established a transport layer connection, such as TCP or UDP, to the branch office appliances 200A-200N. In one embodiment, any of the branch office appliances 200A-200N requests the connection to the aggregator appliance 400A. In another embodiment, the aggregator appliance 400A requests the connection to any of the branch office appliance 200A-200N. In some embodiments, any of the branch office appliances 200A-200N may have a transport layer connection to one or more clients 102, such as with a client agent 120. In another embodiment, any of the branch office appliances 200A-200N may have a transport layer connection to one or more servers 106, such as with a service 270.

The first aggregator appliance 400A may obtain information 410 about any of the first set of branch office appliances 200A-200N via any of its connections to these appliances. In one embodiment, the first aggregator appliance 400A obtains information 410 from a branch office appliance 200 upon establishment of the connection. In another embodiment, the first aggregator appliance 400A obtains information 410 from a branch office appliance 200 upon a predetermined frequency, such as polling every 1 msec or 1 sec. In some embodiments, the first aggregator appliance 400A obtains information 410 from a branch office appliance 200 via a request/reply mechanism. In yet another embodiment, a branch office appliance 200 transmits the information 410 to the aggregator appliance 400A upon startup or on a predetermined frequency, such as pushing the information to the aggregator 400 every 1 msec or 1 sec.

Likewise to step 505, at step 510, the second aggregator appliance 400B establishes a connection, such as a transport layer connection, to a second set of one or more branch offices appliances 200A'-200N'. The second set of branch office appliances 200A'-200N' may have transport layer connections to one or more clients 102 and/or servers 106. The second aggregator appliance 400B may obtain information 410 about any of the second set of branch office appliances 200A'-200N' via any of its connections to these appliances. The second aggregator appliance 400B may receive, request or obtain information 410 at any time or frequency.

Although the first aggregator appliance 400A has information 410A on the first set of branch office appliances 200A-200N and the second aggregator appliance 400B has information 410B on the second set of branch office appliances 200A'-200N', the first aggregator appliance 400A may not know the identification of or have information on any of the second set of branch office appliances 200A'-200N'. Likewise, the second aggregator appliance 400B may not know the identification or have information on any of the firs set of branch office appliances 200A-200N. In some embodiments, a first branch office appliance 200A of the first set of branch office appliances 200A-200N does not know the identification of or have information on any of the second set of branch office appliances 200A'-200N'. In other embodiments, a second branch office appliance 200A' of the second set of branch office appliances 200A'-200N' does not know the identification of or have information on any of the second set of branch office appliances 200A-200N.

At step 515, the first aggregator appliance 400A and the second aggregator appliance 400B establish communications, such as via a transport layer connection, for example, TCP or UDP. In some embodiments, the first aggregator appliance 400A and second aggregator appliance 400B establish one connection between each other for communications. In other embodiments, the first aggregator appliance 400A establishes a connection with the second aggregator appliance 400B, and the second aggregator appliance 400B establishes a connection with the first aggregator appliance 400A.

At step 520, the aggregator appliances 400A and 400B may exchange information 410 on a periodic basis, such as a frequency of every 1 sec or 1 msec. In some embodiments, an aggregator appliance 400A transmits information 410 to another aggregator appliance 400B upon receipt of such information 410 from a branch office appliance 200. In one embodiment, the aggregator appliances 400A and 400B exchange or receive information 410 from a master aggregator appliance 400N'. By the exchange or receipt of information 410, each aggregator appliance 400A-400B has information 410A, 410B on each of the sets of branch office appliances. Although the first aggregator appliance 400A is connected to the first set of branch office appliances 200A-200N, the first aggregator appliance 400A has also obtained information 410B' on the second set of branch office appliances 200A'-200N'. Likewise, although the second aggregator appliance 400B is connected to the second set of branch office appliances 200A'-200N', the second aggregator appliance 400B has also obtained information 410A' on the first set of branch office appliances 200'-200N. With both sets of information 410A, 410B, an aggregator appliance 400 can make switching and load-balancing decisions to access resources across all of the branch office appliances 200 and branch office 405.

At step 525, one of the aggregator appliances 400 received a request from a client to access a resource. In one embodiment, the client 102 transmits the request to the aggregator appliance 400. In another embodiment, a branch office appliance 200 transmits the request on behalf of the client 102 to the aggregator appliance 400. In yet another embodiment, another aggregator appliance 400B may transmit the request to the aggregator appliance 400A. In some embodiments, the request comprises a connect request, such as a TCP or UDP connection request or a VPN request. In other embodiments, the request comprises a session request, such as an SSL or TLS session or an application session such as to a hosted service. In another embodiment, the request comprises a Domain Name Service (DNS) request, such as to resolve a domain name. In one embodiment, the request comprises a request to execute an application, such as via the application delivery system 500. In other embodiments, the request comprises an authentication or authorization request. In yet another embodiment, the request comprises a request to receive a portion of a computing environment 15, such as an application, or portion thereof, or a data file.

At step 535, in response to receipt of the request, the aggregator appliance 400 determines, identifies and selects a branch office appliance 200 to service the request. The aggregator appliance 400 uses any of the information 410A, 410B to determine a branch office appliance 200 suitable to service the request. In one embodiment, the aggregator appliance 400 uses the information 410 to determine, identify and select a server 106 access or serviced by a branch office appliance 200. In some embodiments, the aggregator appliance 400 analyzes or processes any of the operational and/or performance characteristics of the information 410 to determine an appliance 200 suitable for the request. In other embodiments, the aggregator appliance 400 may maintain persistence between a client 102 and a branch office appliance 200. For example, the aggregator appliance 400 may assign a client 102 to a branch office appliance 200 that is currently servicing the client 102, recently serviced the client 102 or has previously serviced the client 102.

In some embodiments, the first aggregator appliance 400A identifies and selects a second branch office appliance 200A' from the second set of branch office appliances 200A'-200N'. In one embodiment, the first aggregator appliance 400A identifies and selects a first branch office appliance 200A from the first set of branch office appliances 200A-200N. In other embodiments, the second aggregator appliance 400B identifies and selects a first branch office appliance 200A from the first set of branch office appliances 200A-200N. In yet another embodiment, the second aggregator appliance 400B identifies and selects a second branch office appliance 200A' from the second set of branch office appliances 200A'-200N'.

At step 540, the aggregator appliance 400 in response to the client request, transmits information about the selected branch office appliance 200 to the client 102 or the appliance 200 servicing the client 102. In one embodiment, the aggregator appliance 400 transmits the identification or selection of the appliance 200 directly to the client 102, such as to client agent 120. In another embodiment, the aggregator appliance 400 transmits the identification or selection of the appliance 200 to the branch office appliance 2—. In some embodiments, the aggregator appliance 400 identifies to the client 102 or branch office appliance the IP address or domain name, or other IP layer information, of the selected branch office appliance 200. In other embodiments, the aggregator appliance 400 identifies to the client 102 or branch office appliance 200 information to connect to the selected branch office appliance 200.

At step 545, the client 102 establishes a connection with the branch office appliance 200 selected or identified by the aggregator appliance 400. In some embodiments, the client 102, such a via client agent 120, establishes a transport layer connection, for example, a TCP or UDP with the selected branch office appliance 200. In other embodiments, the branch office appliance 200 connected to the client 102 establishes a transport layer connection to the selected branch office appliance, for example, on behalf of the client 102. In some embodiments, the client 102 establishes an SSL VPN connection with the selected branch office appliance 200. In some embodiments, the selected branch office appliance 200 provides or establishes connections to one or more servers 106. For example, the branch office appliance 200 may have pooled transport layer connections to the servers 106 over which client requests are multiplexed. In yet other embodiments, the selected branch office appliance 200 may provide additional load-balancing/switching functionality 284 for the client 102. In another embodiments, the selected branch office appliance 200 provides acceleration or application firewall services to the client 102.

Although an embodiment of the method 500 is generally described above in connection with a client 102 accessing the resource from a branch office 405 and/or branch office appliance 200, the method 500 may be practiced with any client 102 accessing the aggregator appliances 400 from any location. For example, as illustrated in FIG. 4A, clients 102b and 102n may access an aggregator appliance 400 without first accessing a branch office appliance 200. In one embodiment, a client 102b or 102n may be on the Internet and connect to an aggregator appliance 200. In other embodiments, the client 102 or 102n may be on the same network 104, such as a LAN, as the aggregator appliance 400A-400N. The aggregator appliance 400 can load-balance the client's request and direct the client 102b-102n to a selected branch office appliance 200.

In view of the structure, functions and operations of the aggregator appliances described herein, the aggregator appliances provide for reduced configuration of branch office appliances while also providing a scalable, hierarchical deployment of branch office appliances. By exchanging branch office appliance information among aggregator appliances deployed in a hierarchical fashion, any of the aggregator appliances can make load-balancing and switching decisions to access any of the branch office appliances, or any resources provided via branch office appliances. Although a branch office appliance may be configured to communicate with or know of an aggregator appliance, the branch office appliance may learn of or obtain information of other branch office resources via the aggregation and load-balancing techniques discussed herein. The aggregator appliances globally load-balance resource requests of any client from any location across all branch offices and branch office appliances.

We claim:

1. A method for providing a hierarchy of appliances to more efficiently access resources across a plurality of branch offices, the method comprising:
   (a) establishing, by a first aggregator appliance, connections with a first plurality of branch office appliances, each of the first plurality of branch office appliances providing access via one or more connections to one or more services of a first plurality of servers to a first plurality of client devices in a first branch office;
   (b) establishing, by a second aggregator appliance, connections with a second plurality of branch office appliances, each of the second plurality of branch office appliances providing access via one or more connections to one or more services of a second plurality of servers to a second plurality of client devices in a second branch office, the first plurality of branch office appliances not having information identifying the second plurality of branch office appliances;
   (c) establishing a connection between the first aggregator appliance and the second aggregator appliance to exchange aggregated information about branch office appliances not connected to an aggregator appliance receiving the information, the first aggregator appliance receiving from the second aggregator appliance aggregated information about operation of the second plurality of branch office appliances collected by the second aggregator appliance;
   (d) receiving, by the first aggregator appliance, from a first branch office appliance of the first plurality of branch offices appliances a request from a client device for access to a resource;
   (e) identifying, by the first aggregator appliance via the aggregated information from the second aggregator appliance, a second branch office appliance from the second plurality of branch office appliances to service the request;
   (f) transmitting, by the first aggregator appliance, to the first branch office appliance information identifying the second branch office appliance; and
   (g) establishing, by the client device, a connection with the second branch office appliance.

2. The method of claim 1, wherein step (f) further comprises transmitting, by the first branch office appliance, information identifying the second branch office appliance to the client device.

3. The method of claim 1, comprising establishing, by the client device via the first branch office appliance, a second connection via the second branch office appliance with a server.

4. The method of claim 3, comprising communicating, by the first aggregator appliance, information about the first plurality of branch office appliances to the second aggregator appliance.

5. The method of claim 3, comprising communicating, by the second aggregator appliance, information about the second plurality of branch office appliances to the first aggregator appliance.

6. The method of claim 1, comprising establishing, by the first aggregator appliance, communications with the second aggregator appliance.

7. The method of claim 1, determining, by the first aggregator appliance, information on one of performance or operational characteristics for each of the first plurality of branch office appliances.

8. The method of claim 7, wherein step (e) comprising selecting, by the first aggregator appliance, the second branch office appliance based on one of the performance or operational characteristics.

9. The method of claim 1, determining, by the second aggregator appliance, one of performance or operational characteristics of each of the second plurality of branch office appliances.

10. The method of claim 9, comprising accelerating, by one of the first office branch office appliance or the second branch office appliance, communications between the client device and the server.

11. The method of claim 10, wherein accelerating comprises using one or more of the following techniques: compression; TCP connection pooling; TCP connection multiplexing; TCP buffering; and caching.

12. The method of claim 1, wherein one of the first aggregator appliance or the second aggregator appliance is deployed at a data center.

13. The method of claim 1, wherein the client device is deployed at the first branch office.

14. A system for providing a hierarchy of appliances to more efficiently access resources across a plurality of branch offices, the system comprising:
 a first aggregator appliance establishing connections with a first plurality of branch office appliances, each of the first plurality of branch office appliances providing access via one or more connections to one or more services of a first plurality of servers to a first plurality of client devices in a first branch office;
 a second aggregator appliance establishing connections with a second plurality of branch office appliances, each of the second plurality of branch office appliances providing access via one or more connections to one or more services of second plurality of servers to a second plurality of client devices in a second branch office, the first plurality of branch office appliances not having information identifying the second plurality of branch office appliances; and
  wherein a connection is established between the first aggregator appliance and the second aggregator appliance to exchange aggregated information about branch office appliances not connected to an aggregator appliance receiving the information, the first aggregator appliance receiving from the second aggregator appliance aggregated information about operation of the second plurality of branch office appliances collected by the second aggregator appliance; and
 a first branch office appliance of the first plurality of branch offices transmitting to the first aggregator appliance a request from a client device for access to a resource;
 wherein the first aggregator appliance identifies via the second aggregator appliance, a second branch office appliance from the second plurality of branch office appliances to service the request, and transmitting to the first branch office appliance information identifying the second branch office appliance; and
 the client device establishes a connection with the second branch office appliance.

15. The system of claim 14, wherein the first branch office appliance transmits information identifying the second branch office appliance to the client device.

16. The system of claim 14, wherein the client device establishes via the first branch office appliance a second connection via the second branch office appliance with a server.

17. The system of claim 14, wherein the first aggregator appliance establishes communications with the second aggregator appliance.

18. The system of claim 17, wherein the first aggregator appliance communicates information about the first plurality of branch office appliances to the second aggregator appliance.

19. The system of claim 14, wherein the second aggregator appliance communicates information about the second plurality of branch office appliances to the first aggregator appliance.

20. The system of claim 14, wherein the first aggregator appliance determines information on one of performance or operational characteristics for each of the first plurality of branch office appliances.

21. The system of claim 14, wherein the second aggregator appliance determines one of performance or operational characteristics of each of the second plurality of branch office appliances.

22. The system of claim 21, wherein the first aggregator appliance selects the second branch office appliance based on one of the performance or operational characteristics.

23. The system of claim 14, wherein one of the first office branch office appliance or the second branch office appliance accelerates communications between the client device and a server.

24. The system of claim 23, wherein accelerating comprises using one or more of the following techniques: compression; TCP connection pooling; TCP connection multiplexing; TCP buffering; and caching.

25. The system of claim 14, wherein one of the first aggregator appliance or the second aggregator appliance is deployed at a data center.

26. A method for providing a hierarchy of aggregator appliances and branch office appliances to more efficiently access resources on servers across branch offices, the method comprising the steps of:
 (a) establishing, by a first aggregator appliance, a first connection with a first branch office appliance, the first branch office appliance intermediary to the first aggregator appliance, a first plurality of client devices, and a first plurality of servers;
 (b) establishing, by a second aggregator appliance, a second connection with a second branch office appliance, the second branch office appliance intermediary to the second aggregator appliance, a second plurality of client devices, and a second plurality of servers, the first branch office appliance lacking information identifying the second branch office appliance;
 (c) establishing a connection between the first aggregator appliance and the second aggregator appliance to exchange aggregated information about branch office appliances not connected to an aggregator appliance receiving the information, the first aggregator appliance receiving from the second aggregator appliance aggregated information about operation of the second plurality of branch office appliances collected by the second aggregator appliance;
 (d) transmitting, by the second branch office appliance, to the second aggregator appliance aggregated information about the second branch office appliance created from information received from the second plurality of servers;
 (e) receiving, by the first aggregator appliance, via the first branch office appliance a request for access to a resource from a client device of the first plurality of client devices;

(f) identifying, by the first aggregator appliance based on information about the second branch office appliance received from the second aggregator appliance, the second branch office appliance to service the request; and (g) establishing, by the client device of the first plurality of client devices, a third connection with the second branch office appliance to access the requested resource on a server of the second plurality of servers.

* * * * *